US012626075B2

(12) United States Patent
Schütz

(10) Patent No.: US 12,626,075 B2
(45) Date of Patent: May 12, 2026

(54) READING APPARATUS FOR A CONTACTLESS READOUT OF INFORMATION ON OBJECTS AND METHODS FOR SAFEGUARDING SUCH A READING APPARATUS

(71) Applicant: SICK AG, Waldkirch (DE)

(72) Inventor: Frank Schütz, Rheinhausen (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/213,106

(22) Filed: Jun. 22, 2023

(65) Prior Publication Data

US 2023/0419054 A1     Dec. 28, 2023

(30) Foreign Application Priority Data

Jun. 28, 2022    (DE) ......................... 102022116032.7

(51) Int. Cl.
| *G06K 7/00* | (2006.01) |
| *G06K 7/10* | (2006.01) |
| *G06K 7/14* | (2006.01) |

(52) U.S. Cl.
CPC ....... *G06K 7/0021* (2013.01); *G06K 7/10198* (2013.01); *G06K 7/10297* (2013.01); *G06K 7/1413* (2013.01); *G06K 7/1417* (2013.01)

(58) Field of Classification Search
CPC .............. G06K 7/0008; G06K 7/0021; G06K 7/10237; G06K 7/0013; G06K 7/1413; G06K 7/10158; G06K 7/087; G06K 7/10881; G06K 7/0026; G06K 7/10326; G06K 7/0069; G06K 7/0095; G06K 19/06037; G06K 7/0004; G06K 19/07769; G06K 7/1417; G06K 7/10297; G06K 7/10198; G06K 19/07363; G06K 7/0082; G06K 7/08; G06K 19/07735; G06K 7/006; G06K 7/10386
See application file for complete search history.

(56) References Cited

U.S. PATENT DOCUMENTS

| 2011/0261551 | A1* | 10/2011 | Chirila | ............... | G06K 7/10386 |
| | | | | | 361/818 |
| 2013/0181050 | A1* | 7/2013 | McConnell | .......... | G06K 7/1091 |
| | | | | | 235/440 |

(Continued)

FOREIGN PATENT DOCUMENTS

| DE | 202015009222 U1 | 12/2016 |
| EP | 3726488 A1 | 10/2020 |

(Continued)

OTHER PUBLICATIONS

Tessier, "An Energy-Aware Active Smart Card" (Year: 2005).*

(Continued)

*Primary Examiner* — Thien T Mai
(74) *Attorney, Agent, or Firm* — Nath, Goldberg & Meyer; Jerald L. Meyer

(57)     ABSTRACT

A reading apparatus for a contactless readout of information on objects that can be guided past the reading apparatus, wherein the reading apparatus has a data processing unit, a scanner unit, a communication unit, a contact recognition unit, and a housing. The contact recognition unit is configured to recognize contacts with the housing of the reading apparatus.

20 Claims, 3 Drawing Sheets

(56)     References Cited

U.S. PATENT DOCUMENTS

| | | | | |
|---|---|---|---|---|
| 2013/0320081 | A1* | 12/2013 | Olson | G06Q 20/341 |
| | | | | 235/488 |
| 2015/0295400 | A1* | 10/2015 | Pavageau | H05K 5/0247 |
| | | | | 361/56 |
| 2017/0061746 | A1* | 3/2017 | Tanaka | G06K 7/0004 |
| 2017/0185810 | A1* | 6/2017 | Beals | G06K 19/07743 |
| 2018/0041024 | A1* | 2/2018 | Demange | G06K 19/07735 |
| 2018/0253577 | A1* | 9/2018 | Moriyama | G06K 7/1413 |
| 2018/0314365 | A1* | 11/2018 | Kihara | G06F 3/044 |

FOREIGN PATENT DOCUMENTS

| | | | | | |
|---|---|---|---|---|---|
| JP | 06251180 | H | | 9/1994 | |
| JP | 3779867 | B2 | * | 5/2006 | H01R 12/727 |
| JP | 4066520 | B2 | * | 3/2008 | |
| JP | 2019219703 | A | | 12/2019 | |
| WO | 2016143948 | A1 | | 9/2016 | |
| WO | WO-2017164262 | A1 | * | 9/2017 | G06F 3/0393 |

OTHER PUBLICATIONS

Twisting Sliding Mode Control of an Electrostatic MEMS Micromirror for a Laser Scanning System (Year: 2019).*

German Search Report for corresponding application 10 2022 116 032.7 issued Jun. 2, 2023.

Gamma PLay QR Barcode Scanner, https://play.google.com/store/apps/detai Is?id =com.gamm a.scan&hl = de&gl = US, updated on Oct. 20, 2022.

Saini, Manjul, NFC RFID Reader Tools Tag, https://play.google.com/store/apps/details?id = eom.manjul.utility.nfc.reader, updated on Aug. 5, 2019.

Touchscreen, Wikipedia, http://de.wikipedia.org/w/index.php?title=Touchscreen&oldid=217599935, accessed on Aug. 29, 2023.

Schomberg, Stefan, Über 2000 Euro kostet das erste Smartphone mit Faltdisplay von Samsung, das Vergangenheit und Zukunft in sich vereint. Oberteuerter Unfug oder Must-have?, https://www.techstage.de/test/galaxy-fold-im-test-faltbares-display-to . . . , accessed on Jan. 4, 2023.

* cited by examiner

[DATA]

1     [0.2 sec]     16.12.2020
2     [3.2 sec]     12.01.2021
3     [0.9 sec]     27.01.2022

32    [0.7 sec]     15.03.2022

READING APPARATUS FOR A CONTACTLESS READOUT OF INFORMATION ON OBJECTS AND METHODS FOR SAFEGUARDING SUCH A READING APPARATUS

FIELD

The invention relates to a reading apparatus for a contactless readout of information (e.g. barcodes, RFID tags) on objects and to a method for safeguarding such a reading apparatus.

BACKGROUND

Reading apparatus, which can also be designated as identification devices, can in particular be used to read information, in particular in the form of 1D codes (barcodes), 2D codes (QR codes), and/or RFID tags on objects. An object can be a specific product as well as its packaging. The information that can be read out can in this respect be directly applied to the object (1D codes, 2D codes can be painted on or printed on) or indirectly applied to the object (labels with 1D codes, 2D codes, or RFID tags can be glued on).

These objects are moved past the reading apparatus, for example, on a conveyor belt. The reading apparatus is mounted and set up at the reading point such that that an optimal reading with the best possible quality is achieved. If, in the further course of operation, the reading fails or the quality is reduced (poorer reading rate), the downtimes are often time-consuming and thus also costly. The error analysis is often ambiguous, which in turn influences the downtime. If the downtime increases, the downtime costs usually increase as well.

SUMMARY

It is therefore the object of the present invention to provide a reading apparatus that has a reduced downtime and in particular a simpler error analysis.

The reading apparatus in accordance with the invention serves for the contactless readout of information (e.g. 1D codes (barcodes), 2D codes (QR codes), RFID tags) on objects that can be guided past the reading apparatus. The reading apparatus comprises a data processing unit, a scanner unit, a communication unit, a contact recognition unit, and a housing. The contact recognition unit is configured to recognize contacts with the housing of the reading apparatus.

It is particularly advantageous that contacts with the housing can be recognized via the contact recognition unit. The contact recognition unit is preferably configured to detect any type of contact (whether gentle or forceful, short or long) at the total housing. For example, contacts with the reading apparatus often cause the reading apparatus to change in its orientation and therefore the error rate to increase when reading the information on the objects. Furthermore, contamination of an optical sensor of the scanner unit can also occur, whereby the error rate likewise increases when reading the information.

The communication unit in particular serves to transmit data, such as the read-out information, to a higher-ranking data processing apparatus. The connection to the higher-ranking data processing apparatus in particular takes place in a cable-based manner. It could also take place wirelessly.

The communication unit in particular provides a TCP/IP connection, an Ethernet connection, Profibus, Profinet and/or CAN bus.

The contact recognition unit can be part of the data processing unit. It can also be arranged separately from the data processing unit and can be configured to communicate with the data processing unit.

In accordance with an advantageous embodiment, the scanner unit comprises an optical scanner module. The scanner unit is thereby configured to read optical codes, in particular 1D codes and/or 2D codes. The scanner module can, for example, comprise a laser unit and/or a camera. Additionally or alternatively, the scanner unit comprises a radio module, wherein the scanner unit is then configured to read RFID tags.

In accordance with an advantageous embodiment, the contact recognition unit is configured to recognize electrostatic discharges at the housing based on contacts. These electrostatic discharges at the housing correspond to a contact. The contact recognition unit is further configured to transmit the information of the contact to the data processing unit. Since the contact recognition unit can detect electrostatic discharges, very gentle contacts can also be reliably recognized. In contrast to an acceleration sensor, very small contacts are detected in this way.

In an advantageous embodiment, the data processing unit is configured to be able to draw conclusions about a type of the contact based on the intensity of the electrostatic discharge, wherein the data processing unit is further configured to record the type of the contact in a memory unit and/or to transmit the type of the contact to a higher-ranking data processing apparatus via the communication unit. Thus, it can, for example, be determined in dependence on the intensity whether the contact takes place with a glove or without a glove.

The detection of the electrostatic discharge therefore preferably takes place in an analogous manner. An analog-to-digital converter is further preferably provided that is part of the contact recognition unit. For certain levels of the electrostatic discharge, different types of the contact can be stored in a memory unit that have been determined by tests, for example. The analog-to-digital converter can naturally also be integrated in the data processing unit. If the output value of the analog-to-digital converter lies above a threshold value, a contact can be assumed. The information that the reading apparatus has been contacted can then be transmitted to the higher-ranking data processing apparatus and/or can be recorded in the memory unit. The level of the electrostatic discharge can also be transmitted or recorded.

In an advantageous embodiment, the housing is electrically conductive and is composed of or consists of metal or is composed of or consists of a metal alloy. An electrostatic discharge can thereby be determined particularly efficiently.

In an advantageous embodiment, the contact recognition unit comprises at least one amplifier that is configured to amplify the electrostatic discharges. During the electrostatic discharge, only very small currents flow in some cases that are pre-processed accordingly by the at least one amplifier so that a subsequent recognition is possible. The amplifier is preferably electrically connected to the data processing unit, in particular to an input of the data processing unit (e.g. GPIO (general-purpose input/output pin)) or an analog-to-digital converter. The data processing unit is preferably a microcontroller. An FPGA (Field Programmable Gate Array) could also be used.

In an advantageous embodiment, the housing comprises different housing parts, wherein the different housing parts are electrically insulated from one another. The contact recognition unit is configured to detect which housing part has just been contacted. The different housing parts are in particular the corresponding sides of the housing. The contact recognition unit can, for example, be configured to individually detect electrostatic discharges from each housing part. This information, i.e., for example, how often, when, how hard and/or how long the respective housing part was contacted, can then be transmitted to the data processing unit. The data processing unit is in turn configured to transmit this information to a higher-ranking data processing apparatus by means of the communication unit or to record it in a memory unit.

In an advantageous embodiment, the data processing unit is configured to record a point in time of the contact in a memory unit; and/or to transmit a point in time of the contact to a higher-ranking data processing apparatus via the communication unit. This point in time can comprise the time (preferably at least to the minute) and/or the date.

In an advantageous embodiment, the data processing unit is configured to record a time duration of the contact in a memory unit; and/or to transmit a time duration of the contact to a higher-ranking data processing apparatus via the communication unit. The time duration can, for example, indicate how long the contact is present (the duration of the contact can preferably be specified accurately, at least in tenths of a second).

It is generally possible for the data processing unit to comprise a counter that counts each contact. The counter is preferably incremented with each type of contact.

Furthermore, it would be conceivable that the data processing unit is configured to transmit information to a higher-ranking data processing apparatus at a predetermined counter reading, said data processing apparatus indicating that a certain number of contacts have taken place so that a check of the reading apparatus is carried out by operating personnel.

In an advantageous embodiment, the data processing unit is configured to recognize contact patterns. The contact patterns preferably comprise a plurality of contacts in a certain time period and/or with a certain contact duration. For example, a contact pattern can consist of short contacts (e.g. less than 1 second) and long contacts (e.g. longer than 1 second and shorter than 5 seconds). For example, a contact pattern can consist of three short contacts and one long contact. The contacts take place temporally spaced apart from one another in this respect.

In an advantageous embodiment, the data processing unit is configured to switch to a specific operating mode depending on the contact pattern. Depending on the operating mode, a specific action can, for example, also be triggered, i.e. executed, in the reading apparatus. For example, one operating mode is a "quick start" for e.g. 30 seconds to perform a test reading of information (from a 1D code, a 2D code, or an RFID tag) in order to determine whether this information was acquired correctly or incorrectly. The output, i.e. whether the test reading was error-free or not, can take place via the communication unit to a higher-ranking data processing apparatus or can be output via a visual means (for example, LED) or via an acoustic means. Another operating mode is, for example, "profile programming" in which the reading apparatus can be reprogrammed or re-parameterized with information to be read in. This information can be read in via one or more 1D code(s), 2D code(s), or RFID tag(s). It is generally conceivable that all the theoretically available functions which the reading apparatus supports can be executed in the respective operating mode.

In an advantageous embodiment, the reading apparatus comprises a circuit board. The circuit board comprises at least one conductor path to which the contact recognition unit is connected. In a first embodiment, the housing comprises, at its inner side, a contacting projection that electrically contacts the conductor path in the closed state of the housing. An electrostatic discharge can thereby be transmitted directly to the conductor path. This electrostatic discharge can, for example, be transmitted to an amplifier to be supplied to the data processing unit in amplified form. The electrostatic discharge can also be fed directly to the data processing unit, wherein the contact recognition unit is part of the data processing unit (for example, in the form of an internal analog-to-digital converter) in this case. In a second embodiment, the housing has a screw connection, wherein the screw connection electrically contacts the conductor path in the closed state of the housing. In this case, the electrostatic discharge can be transmitted to the conductor path via the screw connection. In a third embodiment, a cable connection is provided that electrically connects the inner side of the housing to the conductor path. Of course, even further possibilities can be provided as to how an electrical connection between the housing and the contact recognition unit can take place.

In an advantageous embodiment, the data processing unit is configured to correlate a detected contact with the housing with other events. These other events can, for example, be an interruption of a communication between the communication unit and a higher-ranking data processing apparatus. Additionally or alternatively, the event can be a deterioration of the reading rate and/or an interruption of the reading of the information on objects that can be guided past the reading apparatus. The error analysis can be accelerated by such a correlation. For this purpose, the historical data of the contacts (for example, including the date, the time, and/or the contact duration) are in particular also used. If, for example, the front lens becomes contaminated when an optical scanner module is used, a readout of the information is of poorer quality or is no longer possible. If the position of the reading apparatus is changed, for example, by tilting or rotating the reading apparatus, the quality of the readout can likewise be severely impaired. The interruption of the connection lines (in the case of a wired connection) between the communication unit and a higher-ranking data processing apparatus can also cause reading results to be lost. This in particular applies when a loose contact is present. The actuation of a button or a pushbutton at the reading apparatus can also impair the readout quality. The same also applies to the removal of memory cards. If the quality of the readout has therefore deteriorated and if this deterioration has occurred after a contact has been recognized, the troubleshooting can be significantly accelerated.

In an advantageous embodiment, the reading apparatus is arranged in a stationary manner (in operation), i.e. is arranged in a fixed position. In this case, the objects are moved past the reading apparatus.

In an advantageous embodiment, the reading apparatus is configured to transmit the information read out in a contactless manner to a higher-ranking data processing apparatus via the communication unit.

In an advantageous embodiment, the reading apparatus comprises an optical display, in particular in the form of an LED. The data processing unit is configured to control the optical display accordingly when a contact is recognized so that this contact is visualized. The LED is in particular activated. The operating personnel can thereby be alerted to the contact with the reading apparatus, wherein the operating personnel can check the operation of the reading apparatus in this case. An acoustic means for outputting the information that the reading apparatus has been contacted would generally also be conceivable.

In an advantageous embodiment, at least the data processing unit and the contact recognition unit are arranged within the housing of the reading apparatus. The communication unit and/or the scanner unit could generally also be arranged (at least partly) within the housing of the reading apparatus.

The method in accordance with the invention serves to safeguard the reading apparatus that is used for a contactless readout of information on objects. In a first method step, the housing of the reading apparatus is monitored as to whether a contact with the housing is taking place. In a second method step, the contact is recorded. Additionally or alternatively, the fact that a contact has taken place is transmitted to a higher-ranking data processing apparatus via the communication unit.

BRIEF DESCRIPTION OF THE DRAWINGS

The invention will be described purely by way of example with reference to the drawings in the following. There are shown.

DETAILED DESCRIPTION

Figure 1:
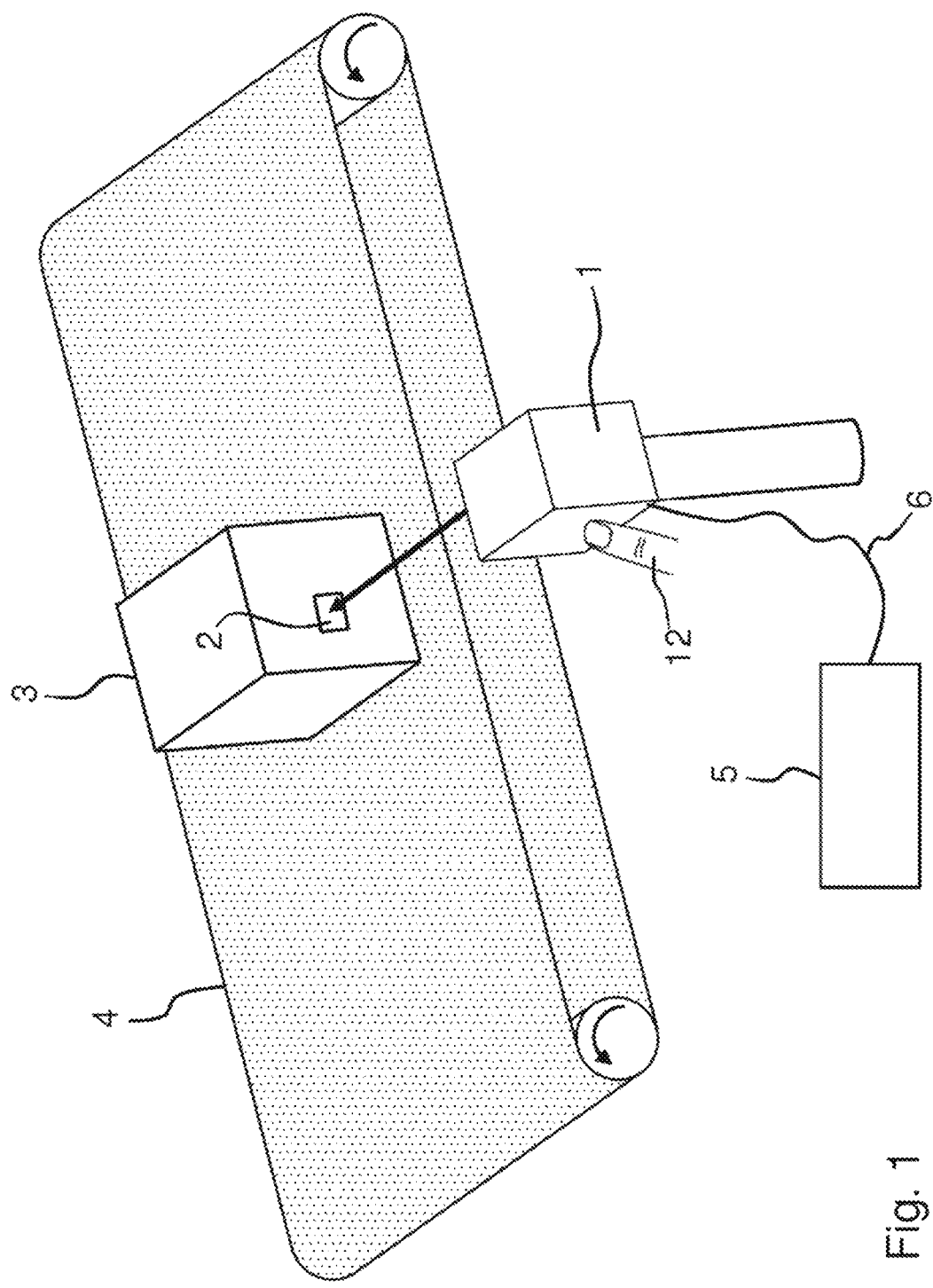
FIG. 1: an embodiment of the reading apparatus in accordance with the invention that reads out information from an object on a conveyor belt.

FIG. 1 shows an embodiment of a reading apparatus 1 in accordance with the invention that is configured to read out information 2 from an object 3 on a conveyor belt 4. The information 2 can be a 1D code (barcode), a 2D code (QR code), or an RFID tag. The readout takes place in a contactless manner. The object 3, for example a package, is preferably moved past the reading apparatus 1. The read-out information 2 can then be used to direct the object 3 to a specific station (e.g. to the correct transport vehicle).

It would generally be conceivable for there to be a plurality of reading apparatus 1 to scan different sides of the object 3. The acquired information 2 can then be transmitted to a higher-ranking data processing apparatus 5. This preferably takes place via a cable connection 6. A TCP/IP connection, an Ethernet connection, Profibus, Profinet and/ or CAN bus is preferably used for this purpose. The reading apparatus 1 comprises a data processing unit 7, a scanner unit 8, a communication unit 9, a contact recognition unit 10, and a housing 11 (see FIGS. 2A, 2B).

The scanner unit 8 can comprise an optical scanner module (for example, a laser unit, a camera unit) and is configured to read optical codes, in particular 1D codes and/or 2D codes. Additionally or alternatively, the scanner unit 8 could also comprise a radio module, whereby the scanner unit 8 is configured to read RFID tags.

The contact recognition unit 10 is configured to recognize electrostatic discharges at the housing 11 based on contacts. Such a contact is symbolized by a finger 12 in FIGS. 1, 2A, 2B.

After a recognized contact, the data processing unit 7 is preferably configured to record this contact and/or to transmit it to the higher-ranking data processing apparatus 5. For this purpose, the same cable connection 6 is preferably used via which the read-in information 2 is also transmitted.

Figure 2B:
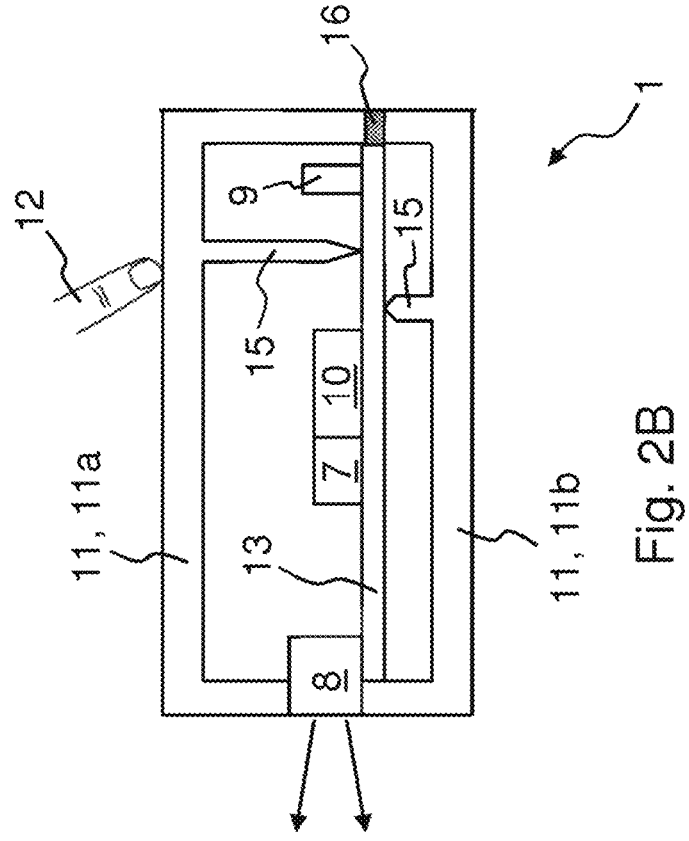
FIGS. 2A, 2B: an exemplary longitudinal section through a housing of the reading apparatus from which it can be seen how electrostatic discharges can be detected at the housing.
Figure 2A:
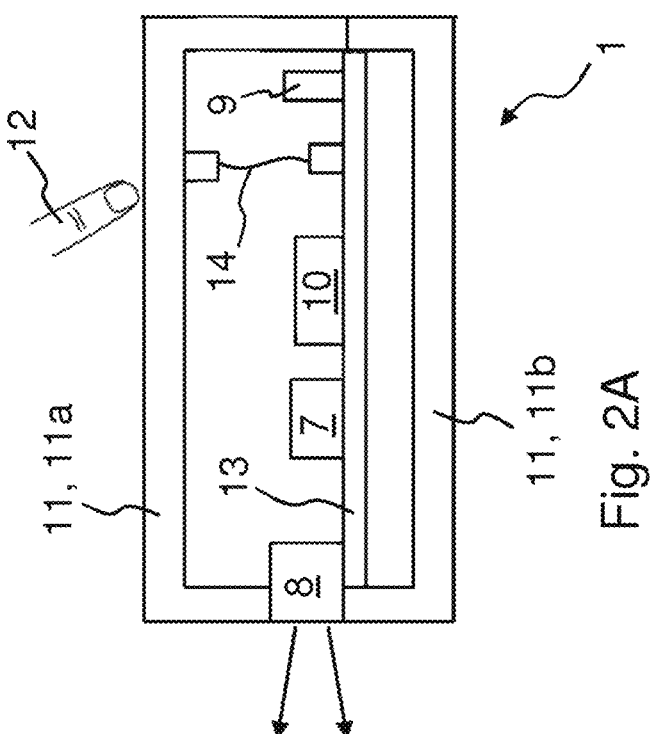

An exemplary longitudinal section through the reading apparatus 4 is shown in FIG. 2A. In this case, the housing 11 comprises two housing parts 11*a*, 11*b* that are preferably half-shell like. Both housing parts 11*a*, 11*b* are preferably screwed to one another. They could also be latched to one another.

The reading apparatus 1 preferably comprises a circuit board 13 that is further preferably arranged solely within the housing 11. The data processing unit 7, the scanner unit 8, the communication unit 9, and the contact recognition unit 10 are preferably arranged on the circuit board 13. The data processing unit 7, the scanner unit 8, the communication unit 9, and the contact recognition unit 10 are preferably arranged on the same side of the circuit board 13. The scanner unit 8 is furthermore arranged in an opening in the housing 11 so that objects 3 that are guided past the reading apparatus 1 enter its field of view. The field of view is symbolized by two arrows.

The housing 11 is connected to a conductor path of the circuit board 13 via a cable connection 14. Electrostatic discharges are transmitted via this cable connection 14. The cable connection 14 can be connected to an inner side of the housing 11 by means of a solder connection and/or a plug-in contact.

The housing 11 is electrically conductive. The housing 11 is preferably composed of or consists of metal. The housing 11 could also be composed of or consist of a metal alloy.

In FIG. 2B, the housing 11 comprises a contacting projection 15 that can be formed in one part at the housing 11 or can be formed in one part at the respective housing part 11*a*, 11*b*. The contacting projection 15 can also be soldered to the housing 11 or to the respective housing part 11*a*, 11*b*. The use of an adhesive connection, if it is electrically conductive, would also be conceivable. The contacting projection 15 could taper in the direction of the circuit board 13. The contacting projection 15 contacts the conductor path of the circuit board 13 in the closed state of the housing 11. In this way, an electrostatic discharge can very easily be transmitted from the housing 11 to the conductor path of the circuit board 13 to be subsequently detected by the contact recognition unit 10 and transmitted to the data processing unit 7.

In FIG. 2B, two contacting projections 15 are shown. A first contacting projection 15 is attached to the first housing part 11*a* and a second contacting projection 15 is attached to the second housing part 11*b*. Both contacting projections 15 contact different conductor paths on the circuit board 13. The first housing part 11*a* and the second housing part 11*b* are galvanically isolated from each other. This can, for example, take place by a dielectric element 16 that is inserted, pressed in, and/or glued in between the two housing parts 11*a*, 11*b*. The dielectric element 16 can, for example, be a (revolving) sealing rubber.

It is thereby possible for the contact recognition unit 10 to recognize which housing part 11*a*, 11*b* was contacted by a user.

The contact recognition unit 10 preferably comprises an amplifier that is configured to amplify the electrostatic discharge.

It is furthermore shown in FIG. 2B that the data processing unit 7 and the contact recognition unit 10 are integrated in a common housing. This can take place by a microcontroller that has an analog-to-digital converter, for example.

Figures 3, 4:
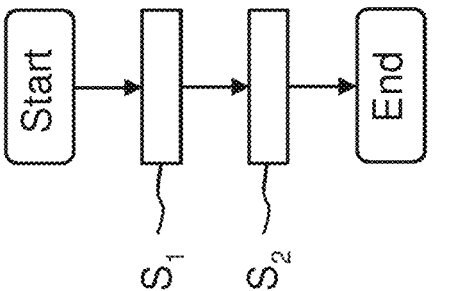
FIG. 3: data that can be recorded in connection with a contact with the housing.
FIG. 4: a flowchart that describes the operation of the reading apparatus.

FIG. 3 shows an overview of data that can be recorded in connection with a contact with the housing 11. In general, every contact is preferably recorded. A counter is further preferably incremented in this case. This is expressed by the number sequences #1, #2, #3, . . . , #32.

The time duration of the contact is preferably also stored. In FIG. 3, the time duration of the contact is between 0.5 s and 3.2 s. Further preferably, the date of the contact is also stored. Additionally or alternatively, the time of the contact can also be stored. The time is preferably stored to the minute and further preferably to the second.

The data processing unit 7 is configured to record these data in a memory unit and/or to transmit them to the higher-ranking data processing apparatus 5 via the communication unit 9.

Furthermore, it would be conceivable for the data processing unit 7 to be configured to allow conclusions about the exact type of the contact based on the intensity of the electrostatic discharge. This type of the contact can be recorded in a memory unit and/or can be transmitted to the higher-ranking data processing apparatus 5 via the communication unit 9.

FIG. 4 shows a flowchart that describes the operation of the reading apparatus 1. In a first method step $S_1$, the housing 11 of the reading apparatus 1 is monitored for contacts by the contact recognition unit 10. It is in particular analyzed whether electrostatic discharges are present or not. In a second method step $S_2$, a correspondingly detected contact is recorded. Additionally or alternatively, a correspondingly detected contact is transmitted to the higher-ranking data processing apparatus 5 via the communication unit 9 of the reading apparatus 1.

In further method steps, not shown, the detected contact can optionally be correlated with further events, such as a deteriorated reading rate of the information 2 on the object 3. In a further method step, not shown, maintenance information for the reading apparatus 1 can furthermore optionally be output so that the operating personnel checks the reading apparatus 1 and, if necessary, readjusts it with respect to its orientation or cleans a glass pane in front of the scanner unit 8.

The invention is not restricted to the embodiments described. Within the scope of the invention, all the described and/or drawn features can be combined with one another in any desired manner.

REFERENCE NUMERAL LIST reading apparatus 1
information 2
object 3
conveyor belt 4
higher-ranking data processing apparatus 5
cable connection 6
data processing unit 7
scanner unit 8
communication unit 9
contact recognition unit 10
housing 11
housing parts 11a, 11b finger 12
circuit board 13
cable connection 14
contacting projection 15
dielectric element 16
method steps $S_1$, $S_2$

The invention claimed is:

1. A reading apparatus for a contactless readout of information on objects that can be guided past the reading apparatus,
   wherein the reading apparatus has a data processing unit, a scanner unit, a communication unit, a contact recognition unit, and a housing,
   wherein, in operation, the reading apparatus is arranged in a fixed position with respect to objects moved past the reading apparatus, and the reading apparatus provides contactless readout of information on the objects moving past the reading apparatus,
   wherein the contact recognition unit is configured to recognize contacts with the housing of the reading apparatus and, responsive to contact, provides an indication of said contact,
   and wherein the reading apparatus comprises a circuit board, wherein the circuit board has a conductor path to which the contact recognition unit is connected, and wherein the housing has, at its inner side, a contacting projection, attached to the housing, that electrically contacts the conductor path in a closed state of the housing and configured to transmit an electrostatic discharge from the housing to the conductor path of the circuit board by contacting the conductive path of the circuit board for detection by the contact recognition unit; and
   responsive to a predetermined criteria of indication of contacts, the data processing unit switches to a predetermined operating mode.

2. The reading apparatus in accordance with claim 1,
   wherein the scanner unit:
   a) comprises an optical scanner module, wherein the scanner unit is configured to read information in the form of optical codes, and/or
   b) comprises a radio module, wherein the scanner unit is configured to read information in the form of RFID tags.

3. The reading apparatus in accordance with claim 2,
   wherein the optical codes comprise one of 1D codes and 2D codes.

4. The reading apparatus in accordance with claim 1,
   wherein the contact recognition unit is configured to recognize electrostatic discharges at the housing based on contacts.

5. The reading apparatus in accordance with claim 4,
   wherein the data processing unit is configured to draw conclusions about a type of the contact based on the intensity of the electrostatic discharge, and wherein the data processing unit is further configured to:
   a) to record the type of the contact in a memory unit; and/or
   b) to transmit the type of the contact to a higher-ranking data processing apparatus via the communication unit.

6. The reading apparatus in accordance with claim 4,
   wherein the housing is electrically conductive and is composed of or consists of metal or a metal alloy.

7. The reading apparatus in accordance with claim 4, wherein the contact recognition unit comprises at least one amplifier that is configured to amplify the electrostatic discharges.

8. The reading apparatus in accordance with claim 4, wherein the housing comprises different housing parts that are electrically insulated from one another, wherein the contact recognition unit is configured to detect which housing part is contacted.

9. The reading apparatus in accordance with claim 1, wherein the data processing unit is configured:

a) to record a point in time of the contact in a memory unit; and/or b) to transmit a point in time of the contact to a higher-ranking data processing apparatus via the communication unit.

10. The reading apparatus in accordance with claim 1, wherein the data processing unit is configured:

a) to record a time duration of the contact in a memory unit; and/or b) to transmit a time duration of the contact to a higher-ranking data processing apparatus via the communication unit.

11. The reading apparatus in accordance with claim 1, wherein the data processing unit is configured to recognize a contact pattern.

12. The reading apparatus in accordance with claim 11, wherein contact patterns comprise a plurality of contacts:

a) in a certain time period; and/or b) with a certain contact duration.

13. The reading apparatus in accordance with claim 11, wherein the data processing unit is configured to switch to a specific operating mode depending on the contact pattern.

14. A reading apparatus for a contactless readout of information on objects guided past the reading apparatus, wherein the reading apparatus has a data processing unit, a scanner unit, a communication unit, a contact recognition unit, and a housing, wherein, in operation, the reading apparatus is arranged in a fixed position with respect to objects moved past the reading apparatus, and the reading apparatus provides contactless readout of information on the objects moving past the reading apparatus, wherein the contact recognition unit is configured to recognize contacts with the housing of the reading apparatus and, responsive to contact, provides an indication of said contact, wherein the contact recognition unit is configured to recognize electrostatic discharges at the housing based on contacts, wherein the housing has, at its inner side, a contacting projection, attached to the housing, that electrically contacts the conductor path in the a closed state of the housing, and responsive to a predetermined criteria of indication of contacts, the data processing unit switches to a predetermined operating mode and configured to transmit an electrostatic discharge from the housing to the conductor path by contacting the conductive path of a circuit board for detection by the contact recognition unit, and wherein the housing is electrically conductive and is composed of or consists of metal or a metal alloy.

15. The reading apparatus in accordance with claim 14, wherein the reading apparatus comprises a circuit board, wherein the circuit board has a conductor path to which the contact recognition unit is connected, and wherein the housing is electrically connected at its inner side to the conductor path via a cable connection.

16. The reading apparatus in accordance with claim 1, wherein the data processing unit is configured to correlate a detected contact with the housing with other events, said other events including one of:

a) an interruption of a communication between the communication unit and a higher-ranking data processing apparatus; and/or b) a deterioration of the reading rate and/or an interruption of the readout of the information on objects that can be guided past the reading apparatus.

17. A method for safeguarding a reading apparatus for a contactless readout of information on objects, comprising the following method steps:

providing contactless readout of the information on the objects moving past the reading apparatus;

monitoring a housing of the reading apparatus as to whether a contact with the housing is taking place using a reading apparatus arranged in a fixed position with respect to the objects while moving the objects past the reading apparatus;

recording that a contact has taken place; and/or communicating that a contact has taken place to a higher-ranking data processing apparatus via a communication unit of the reading apparatus;

responsive to a predetermined criteria of indication of contacts, the data processing unit switches to a predetermined operating mode, wherein the reading apparatus has a contacting projection, attached to the housing, that electrically contacts a housing to detect a conductive path resulting from contact with the housing and configured to transmit an electrostatic discharge from the housing to the conductor path by contacting the conductive path of a circuit board for said detection of the conductive path.

18. The reading apparatus in accordance with claim 14, wherein the reading apparatus comprises a circuit board, wherein the circuit board has a conductor path to which the contact recognition unit is connected, and wherein the housing has a screw connection, wherein the screw connection electrically contacts the conductor path in a closed state of the housing.

19. The reading apparatus in accordance with claim 14, wherein the data processing unit is configured to draw conclusions about a type of the contact based on the intensity of the electrostatic discharge, and wherein the data processing unit is further configured to:

c) to record the type of the contact in a memory unit; and/or d) to transmit the type of the contact to a higher-ranking data processing apparatus via the communication unit.

20. The reading apparatus in accordance with claim 14, wherein the housing comprises different housing parts that are electrically insulated from one another, wherein the contact recognition unit is configured to detect which housing part is contacted.

* * * * *